US009071569B1

(12) United States Patent
Jacobs

(10) Patent No.: US 9,071,569 B1
(45) Date of Patent: Jun. 30, 2015

(54) SYSTEM, METHOD, AND COMPUTER PROGRAM FOR CONTENT METADATA AND AUTHORIZATION EXCHANGE BETWEEN CONTENT PROVIDERS AND SERVICE PROVIDERS

(75) Inventor: David Jacobs, London (GB)

(73) Assignee: Amdocs Software Systems Limited, Dublin (IE)

( * ) Notice: Subject to any disclaimer, the term of this patent is extended or adjusted under 35 U.S.C. 154(b) by 965 days.

(21) Appl. No.: 13/069,315

(22) Filed: Mar. 22, 2011

(51) Int. Cl.
*H04L 29/00* (2006.01)
*H04L 29/06* (2006.01)
*H04L 9/00* (2006.01)

(52) U.S. Cl.
CPC . *H04L 63/00* (2013.01); *H04L 9/00* (2013.01)

(58) Field of Classification Search
CPC ............. G11B 27/105; H04N 21/4147; H04N 21/42669; H04N 21/4532; H04N 21/63345; H04N 21/8355; H04N 21/84
See application file for complete search history.

(56) References Cited

U.S. PATENT DOCUMENTS

| | | | |
|---|---|---|---|
| 2006/0074807 A1 | 4/2006 | Gauba et al. | |
| 2007/0156726 A1* | 7/2007 | Levy | 707/100 |
| 2009/0282432 A1* | 11/2009 | Hahnefeld et al. | 725/31 |
| 2010/0008500 A1* | 1/2010 | Lisanke et al. | 380/201 |
| 2011/0276396 A1* | 11/2011 | Rathod | 705/14.49 |

* cited by examiner

*Primary Examiner* — Brandon Hoffman
*Assistant Examiner* — Helai Salehi
(74) *Attorney, Agent, or Firm* — Zilka-Kotab, PC

(57) ABSTRACT

A system, method, and computer program product are provided for content metadata and authorization exchange between content providers and service providers. In use, content metadata from each of a plurality of content providers is stored in a central repository for use in identifying to each of a plurality of service providers content of the content providers that is accessible to the service provider. Furthermore, communications between the content providers and the service providers associated with authorizations for content access are proxied via a central proxy.

8 Claims, 7 Drawing Sheets

SYSTEM, METHOD, AND COMPUTER PROGRAM FOR CONTENT METADATA AND AUTHORIZATION EXCHANGE BETWEEN CONTENT PROVIDERS AND SERVICE PROVIDERS

FIELD OF THE INVENTION

The present invention relates to connections between content providers and service providers, and more particularly to communications over connections between content providers and service providers.

BACKGROUND

In many situations, content providers allow their content to be accessed by users either directly from the content provider itself or through one or more service providers. As a result, a content provider must regularly provide an update to the service providers indicating which content provided by the content provider each of the service providers are allowed to distribute. In addition, when a content provider desires to authorize a user's request for content, the content provider conventionally has either stored authentication/authorization information for the user or has directly requested that the service provider of the user perform the authentication/authorization on behalf of the content provider.

Unfortunately, the aforementioned communications between the content providers and service providers has required numerous content provider/service provider connections. For example, a connection between a content provider and each service provider distributing content of the content provider has been required to be maintained. There is thus a need for addressing these and/or other issues associated with the prior art.

SUMMARY

A system, method, and computer program product are provided for content metadata and authorization exchange between content providers and service providers. A system, method, and computer program product are provided for content metadata and authorization exchange between content providers and service providers. In use, content metadata from each of a plurality of content providers is stored in a central repository for use in identifying to each of a plurality of service providers content of the content providers that is accessible to the service provider. Furthermore, communications between the content providers and the service providers associated with authorizations for content access are proxied via a central proxy.

DETAILED DESCRIPTION

Figure 1:
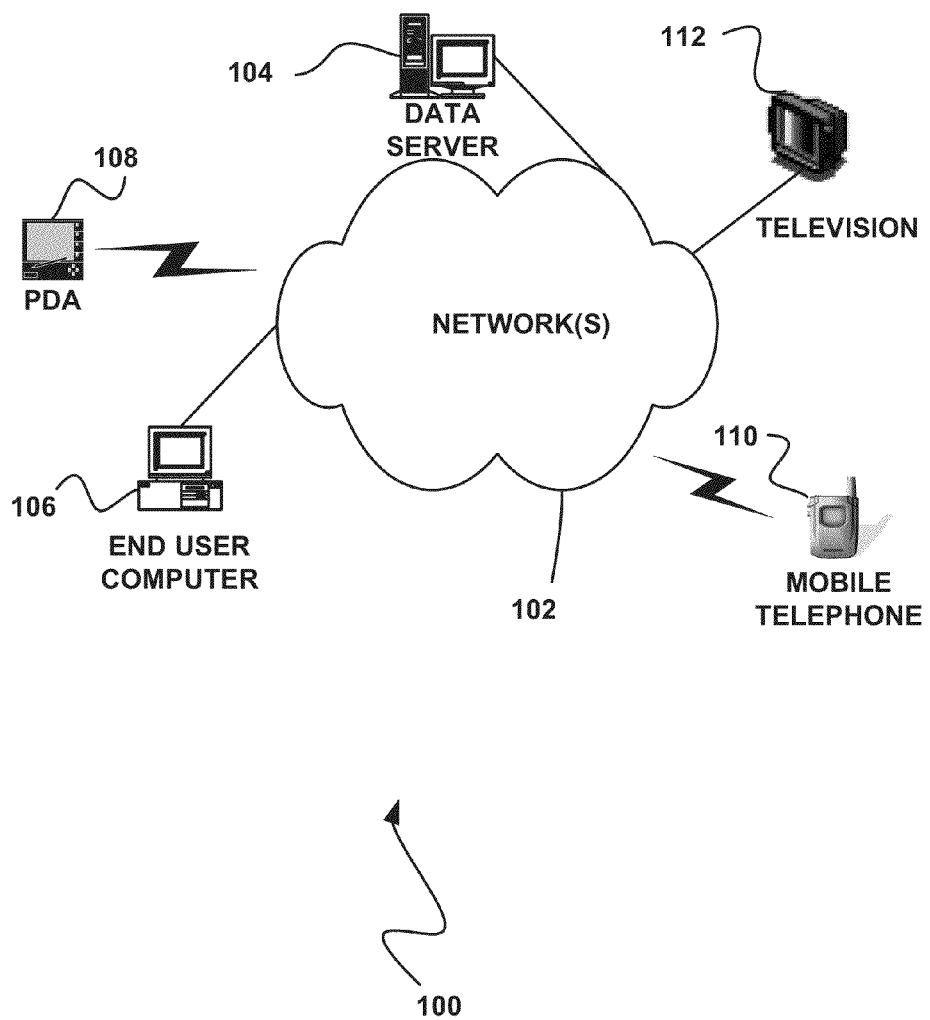
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
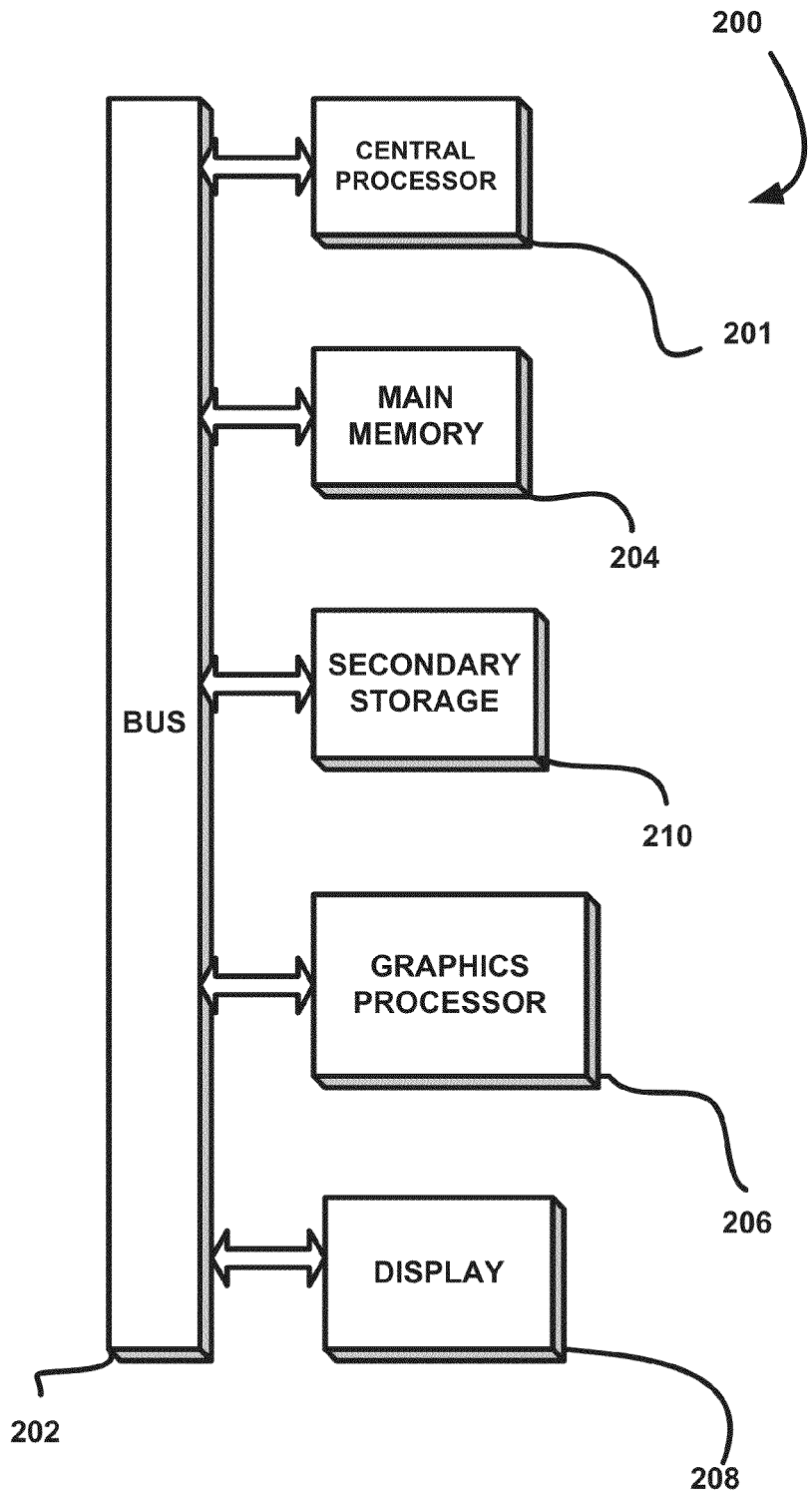
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
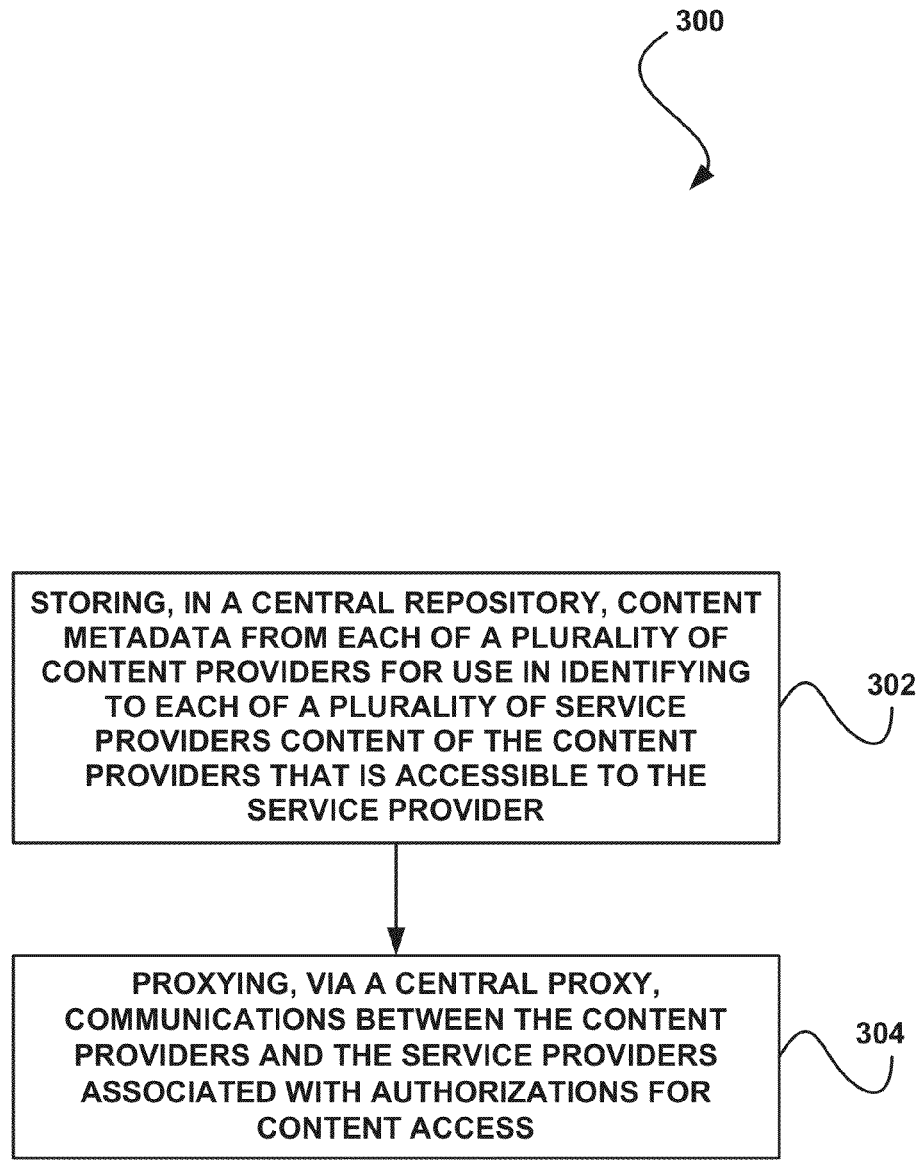
FIG. 3 illustrates a method for content metadata and authorization exchange between content providers and service providers, in accordance with one embodiment.

FIG. 3 illustrates a method 300 for content metadata and authorization exchange between content providers and service providers, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, content metadata from each of a plurality of content providers is stored in a central repository for use in identifying to each of a plurality of service providers content of the content providers that is accessible to the service provider. With respect to the present description, the content providers each include an entity providing content for consumption by users. For example, the content providers may include entities owning the content. In one embodiment, users may access the content directly through the content providers.

It should be noted that the content may include any data that is capable of being consumed by users. For example, the content may include that which is capable of being accessed, viewed, heard, etc. by users. In various embodiments, the content may include video, audio, images, applications, etc.

Further, the content metadata may include any metadata associated with such content. In one embodiment, the content metadata may include a description of the content (e.g. a title, summary, author, size, etc. of the content). In another embodiment, the content metadata may include identification of at least one format in which the content is available. In yet another embodiment, the content metadata may include conditions for accessing the associated content, such as a time period in which the content is available (i.e. a start time and an end time).

As noted above, the content metadata is stored. As an option, the content metadata may be stored according to content provider. Thus, each group of content metadata may be associated with the content provider from which the associated content (i.e. the content described by such metadata) is provided. Of course, however, the content metadata may be stored in any desired manner.

Also in the context of the present description, the service providers each include an entity providing a service to users. For example, the service providers may include network service providers. As noted above, the service providers also have content of the content providers that is accessible to them. For example, the content providers may allow the service providers to provide the content to the users. To this end, the content metadata may be utilized to identify to the service providers the content that is accessible to them (e.g. for provisioning to the users of the service providers).

In one embodiment, the content metadata may be assigned to the service providers. With respect to such embodiment, content associated with such content metadata may be accessible to the service providers when the content metadata is assigned to the service providers (e.g. the content of the content providers may be accessible to the service providers if the content metadata associated with the content is accessible to the service providers). Thus, the content of the content providers that is accessible to the service providers may be determined based on the content metadata. As an example, different subsets of the content metadata may be assigned to different service providers, such that different service providers may be capable of accessing different sets of content.

As an option, in addition to storage of the content metadata, information indicating content of the content providers that is accessible to the service providers may also be stored (e.g. by storing information identifying which content metadata is assigned to which service providers). For example, access data may be stored with the content metadata for indicating which of the content metadata is accessible to which of the service providers. Such information may be from the content providers for allowing the content providers to control which service providers are given access to their content and which of the their content those service providers are given access.

In one embodiment, the content of the content providers that is accessible to the service provider may be identified to the service provider by sending to the service provider the content metadata that is assigned to the service provider. For example, the service provider may receive notification of the storage of the content metadata (or subsequently any updates thereto), such that in response to the notification the service provider may query the stored content metadata for that which is assigned to the service provider. As another example, the service provider may periodically (e.g. on a scheduled basis) query the stored content metadata for that which is assigned to the service provider. As yet another example, the content metadata assigned to the service provider may be periodically pushed automatically to the service provider.

In one embodiment, the metadata may be stored in a repository that is central to (i.e. and accessible by) the content providers and the service providers. As a result, such repository may be utilized, and namely the content metadata therein may be utilized, to identify to each of the service providers content of the content providers that is accessible to the service providers.

Additionally, as shown in operation 304, communications between the content providers and the service providers associated with authorizations for content access are proxied via a central proxy. In one embodiment, the communications between the content providers and the service providers associated with authorizations for content access may include authorization requests from the content providers to the service providers. Thus, the central proxy may proxy the authorization requests from the content providers to the service providers. It should be noted that in the context of the present operation, one of the service providers may be considered a content provider where such service provider is a third party roaming partner to another one of the service providers (e.g. where the third party roaming partner is used by a user to access content when the user is outside of an area from the network of the service provider subscribed to by the user).

Each of such authorization requests may include a request to authorize a user to access content. Accordingly, each of the authorization requests may be initiated upon a request by a user to access content via one of the content providers (e.g. via a website of one of the content providers). As an option, each authorization request may be proxied to one of the service providers providing a service to the user (e.g. providing a service to which the user subscribes).

As a further option, the service provider providing the service to the user (e.g. providing the service to which the user subscribes) may be identified from the authorization request received from the one of the content providers. Just by way of example, the authorization request may include an identifier of the service provider to which the user subscribes (or other routing information associated with such service provider). To this end, the central proxy may be utilized for determining to which of the service providers an authorization request from a content provider is to be sent.

To this end, authorizations associated with user access to content may be performed by the service providers in response to receipt of the authorization requests. For example, the service provider which receives the authorization request may determine whether the user is authorized to access the content. In this way, a result of the authorization may be identified from such service provider. It should be noted that the result may include one of an authentication validation indicating that the user is authorized to access the content and an authentication failure indicating that the user is not authorized to access the content.

In one embodiment, the authorization may include authenticating the user utilizing credentials input by the user (or stored by the user device). For example, the credentials may be specific to the service provider performing the authorization. In particular, the credentials may be stored by such service provider for use in validating credentials received from the user or user device.

In another embodiment, the authorization may include validating that the user is entitled to access the content. For example, as described above, the content metadata associated with the content may include conditions upon which the content is accessible (e.g. a start and end time during which the content is available). Thus, it may be determined that the user is entitled to the content if the conditions are met. As another example, the service provider performing the authorization may have its own conditions upon which the content is made accessible to the user, such as the user subscribing the content, a channel providing the content, a user being up-to-date on his subscription to the service provided by the service provider, etc.

In another embodiment, the communications between the content providers and the service providers associated with authorizations for content access may include authorization responses to the authorization requests from the service providers to the content providers. Such authorization responses may indicate whether the user is authorized to access the content. Thus, the authorization responses may include the result of the above described authorization performed by the service provider.

Still yet, the authorization response may be provided to the content provider from which the authorization request was received. To this end, the central proxy may be utilized for determining to which of the content providers an authorization response from a service provider is to be sent. The content provider receiving the authorization response may then utilize the authorization response to determine whether to grant or deny the user access to the content.

For example, if the authorization response is an authentication validation indicating that the user is authorized to access the content, the content provider provided such authorization response may allow the user to access the content. As another example, if the authorization response is an authentication failure indicating that the user is not authorized to access the content, the content provider provided such authorization response may deny the user access to the content.

In one embodiment, the receipt of the authorization response and the provisioning of the authorization response to the content provider requesting the authorization may be performed utilizing the central proxy that is central to the content providers and the service providers. Such proxy may be provided by a service also providing the aforementioned central repository storing the content metadata. By using the central proxy and the central repository, direct connections between the content providers and the service providers may not necessarily be utilized for communicating between the content providers and the service providers. In particular, direction connections may not necessarily be utilized where the aforementioned communications involve content providers identifying to service providers which of their content the service providers are allowed to access and where the aforementioned communications involve content providers requesting authorizations from other service providers.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
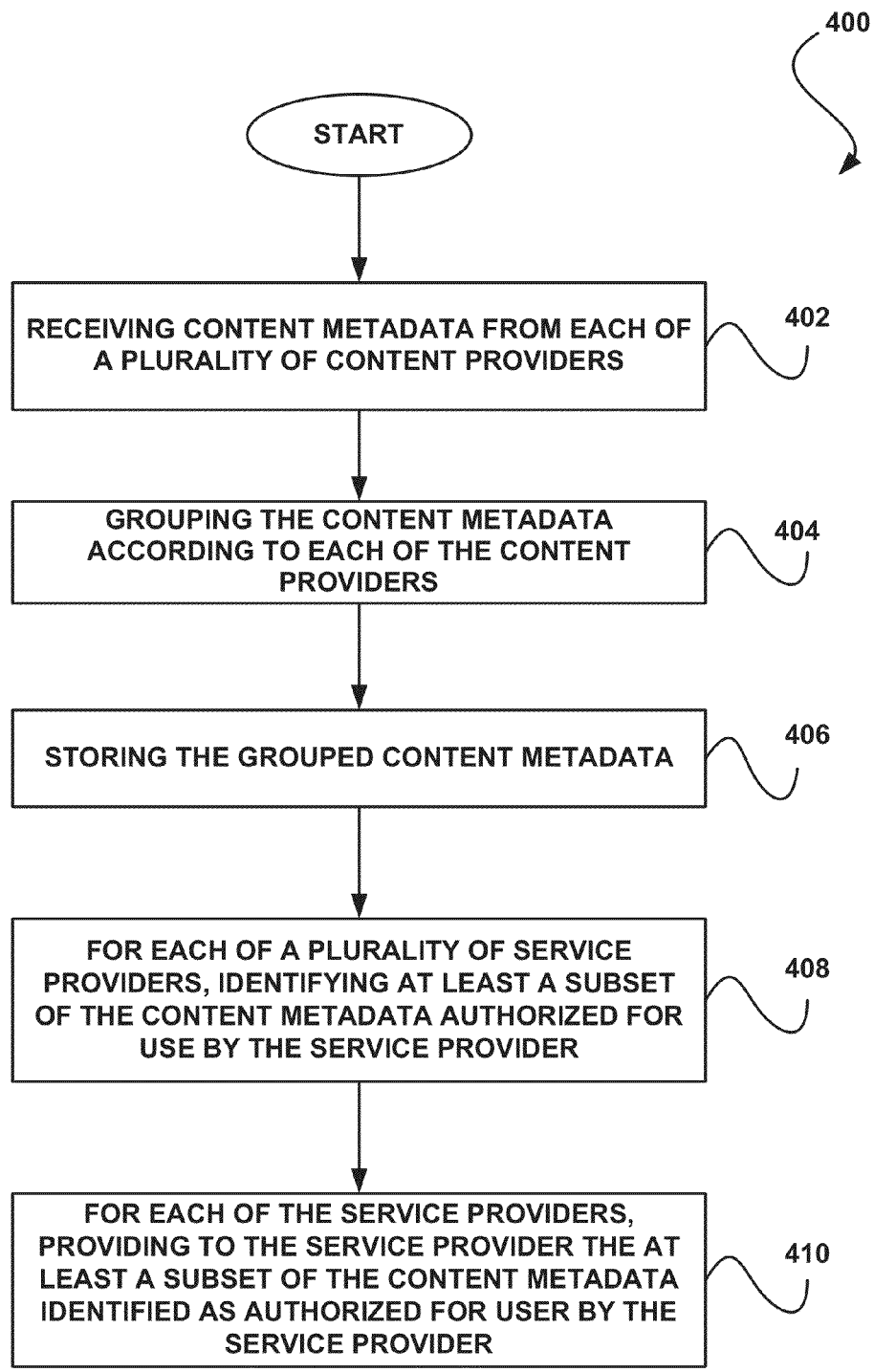
FIG. 4 illustrates a method for content metadata exchange between a content providers and service providers, in accordance with another embodiment.

FIG. 4 illustrates a method 400 for content metadata exchange between a content providers and service providers, in accordance with another embodiment. As an option, the method 400 may be carried out in the context of the details of FIGS. 1-3. For example, the method may be carried out utilizing the central repository described above. Of course, however, the method 400 may be carried out in any desired environment. Again, the aforementioned definitions may equally apply to the description below.

As shown in operation 402, content metadata is received from each of a plurality of content providers. For each content provider, the content metadata associated with that content provider's content is received from that content provider. Thus, content providers may provide content metadata for their own content.

Additionally, the content metadata is grouped according to each of the content providers. Note operation 404. In one embodiment, a group of content metadata may be generated for each of the content providers, where the group for a particular content provider only includes content metadata received from that content provider. To this end, each group of content metadata may optionally only include content metadata for a single content provider.

Further, the grouped content metadata is stored, as shown in operation 406. Still yet, for each of a plurality of service providers, at least a subset of the content metadata authorized for use by the service provider is identified. Note operation 408. In particular, each of the service providers may optionally only be authorized to use a subset of the content metadata (e.g. as a whole, in each group, etc.).

In one embodiment, each group of content metadata may be associated with access data indicating which content metadata in the group each service provider is authorized to use. Such access data may be provided by (i.e. and configured by) the content provider with which the group is associated. In this way, different service providers may be authorized to use different subsets of content metadata.

It should be noted that the service providers may use the content metadata in any desired manner. Just by way of example, the service providers may use the content metadata to provide users with a listing (e.g. catalog) of content available via the service providers. As another example, the service providers may use the content metadata to determine which content they are authorized to provide to their users (e.g. where a service provider is only given authorization for content having associated content metadata authorized for use by a service provider).

Still yet, as shown in operation 410, for each of the service providers, the at least a subset of the content metadata identified as authorized for use by the service provider is provided to the service provider. In one embodiment, the subset of the content metadata that is authorized for use by the service provider may be provided to the service provider automatically be pushing the subset of the content metadata to the service provider.

In another embodiment, the subset of the content metadata that is authorized for use by the service provider may be provided to the service provider in response to a request from the service provider for the subset of the content metadata. For example, the service provider may submit the request on a scheduled periodic basis. As another example, the service provider may submit the request in response to notification of the storage of the content metadata (operation 406).

Figure 5:
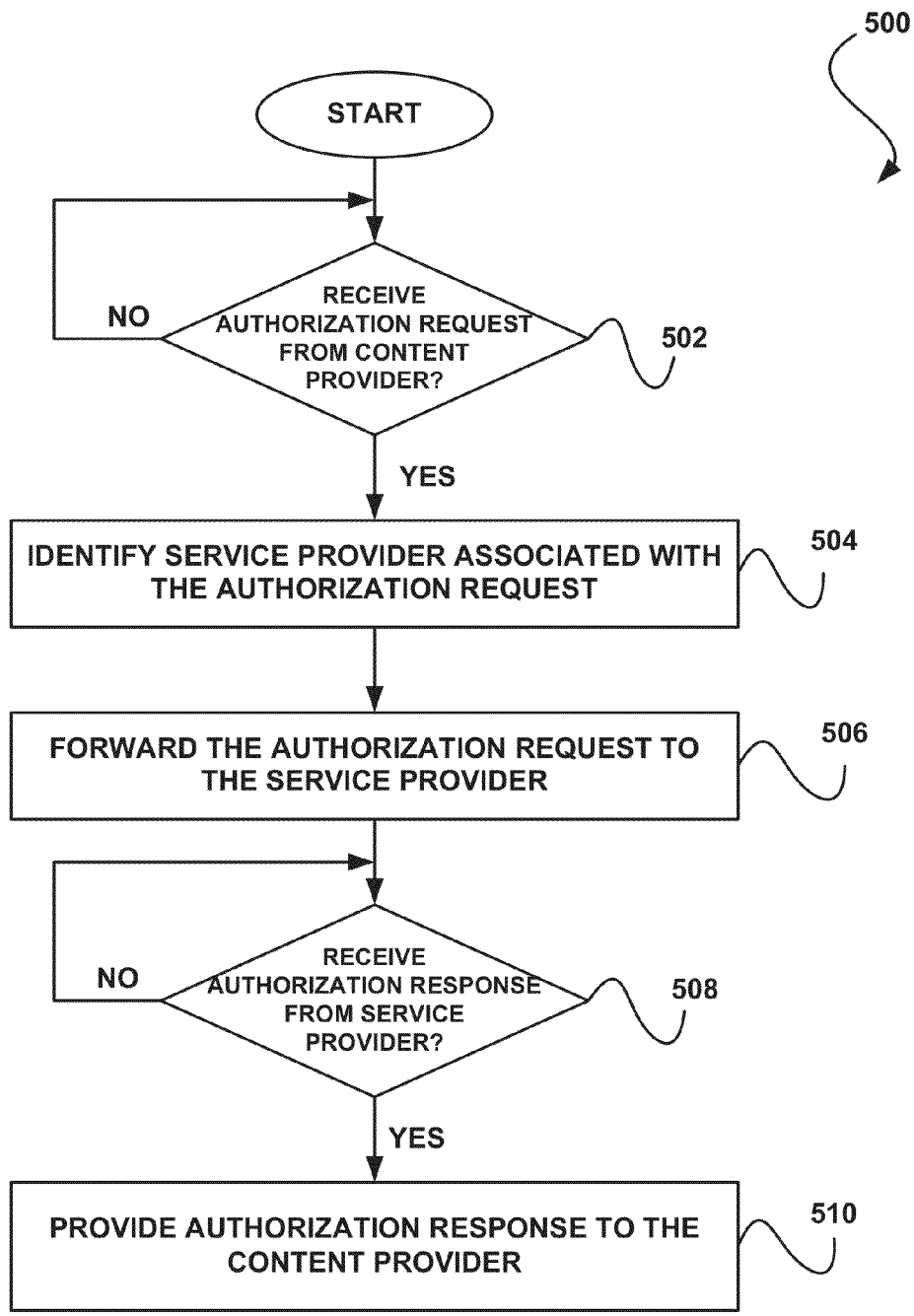
FIG. 5 illustrates a method for authorization exchange between a content provider and a service provider, in accordance with yet another embodiment.

FIG. 5 illustrates a method 500 for authorization exchange between a content provider and a service provider, in accordance with yet another embodiment. As an option, the method 500 may be carried out in the context of the details of FIGS. 1-4. For example, the method 500 may be performed by the central proxy described above with respect to FIG. 3. Of course, however, the method 500 may be carried out in any desired environment. Again, the aforementioned definitions may equally apply to the description below.

As shown in decision 502, it is determined whether an authorization request has been received from a content provider. In the context of the present embodiment, the authorization request may include any request to authorize access to content of the content provider by a user. Thus, the authorization request may be sent by the content provider in response to a request by the user to access the content.

If it is determined that an authorization request has not been received from a content provider, the method 500 continues to wait for such an authorization request to be received. Once it is determined that an authorization request has been received from a content provider, a service provider associated with the authorization request is identified. Note operation 504. For example, the service provider may be identified from the authorization request (e.g. where the authorization request includes an identifier of the service provider).

In the present embodiment, the service provider that is identified may include a service provider capable of providing authorization for the particular user that has requested access to the content. For example, the user may be a subscriber to the service provider. In this way, the service provider may store credential information capable of being used to authorize the user.

Additionally, the authorization request is forwarded to the service provider, as shown in operation 506. Accordingly, the service provider capable of authorizing access to the content by the user may receive the request to perform the authorization. It is then determined whether an authorization response has been received from the service provider, as shown in decision 508.

If it is determined that an authorization response has not been received from the service provider, the method 500 continues to wait for such a response to be received. However, once it is determined that an authorization response has been received from the service provider, the authorization response is provided to the content provider. Note operation 510.

In the context of the present embodiment, the authorization response includes any response to the authorization request. In one embodiment, the authorization request may be a result of a determination of whether the user is authorized to access the content (i.e. determining whether the user's credentials are valid, determining whether the user is entitled to the content, etc.). Just by way of example, the authorization response may include an authentication validation indicating that the user is authorized to access the content or an authentication failure indicating that the user is not authorized to access the content.

As an option, the authorization response may be converted prior to being provided to the content provider. For example, the authorization response may be converted into a format used by the content provider. Accordingly, the converted authorization response may be provided to the content provider for use by the content provider in granting or denying the user access to the content.

Figure 6:
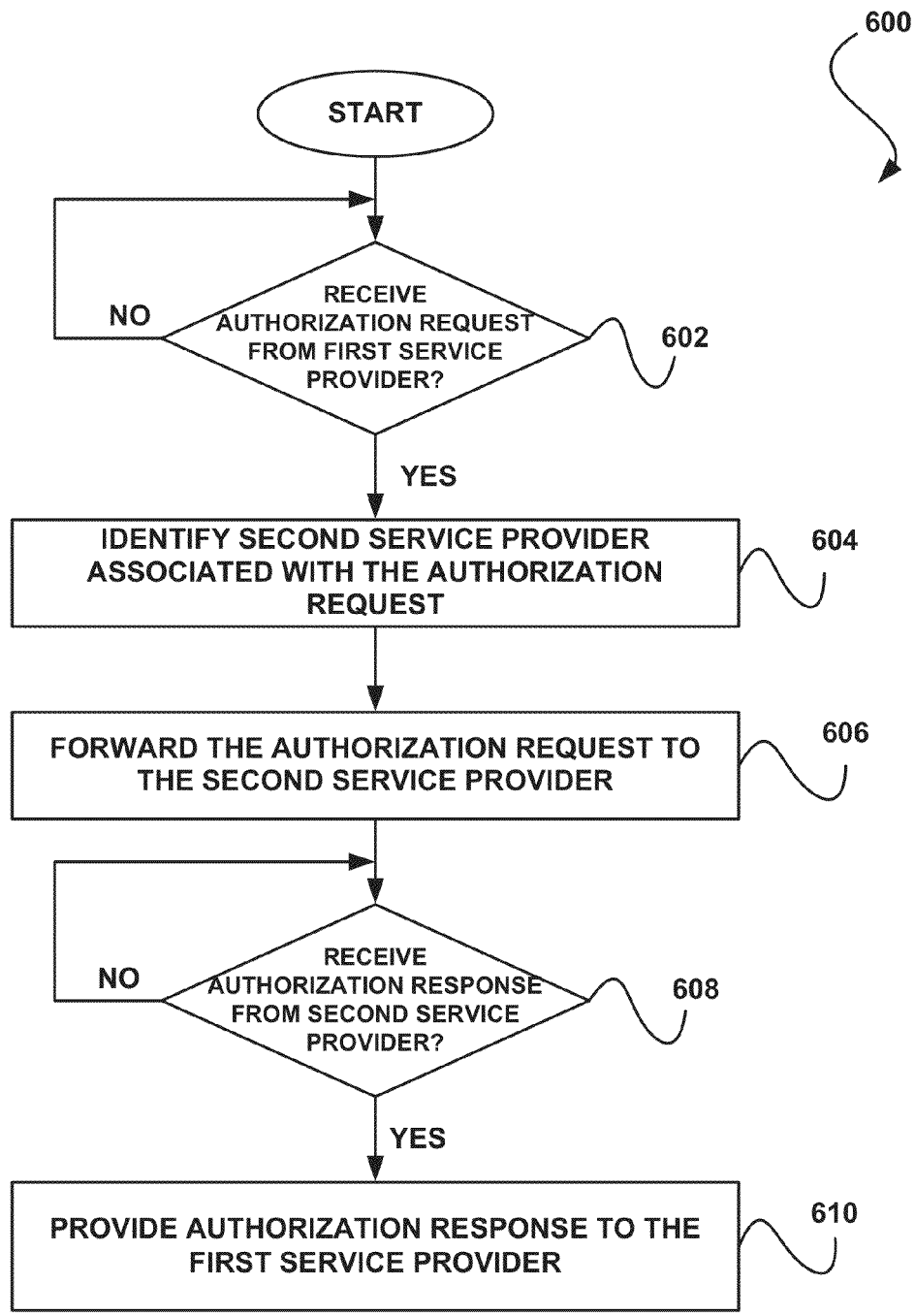
FIG. 6 illustrates a method for authorization exchange between a first service provider and a second service provider, in accordance with still yet another embodiment.

FIG. 6 illustrates a method 600 for authorization exchange between a first service provider and a second service provider, in accordance with still yet another embodiment. As an option, the method 600 may be carried out in the context of the details of FIGS. 1-5. For example, the method 600 may be performed by the central proxy described above with respect to FIG. 3. Of course, however, the method 600 may be carried out in any desired environment. Again, the aforementioned definitions may equally apply to the description below.

It should be noted that the present method 600 is associated with an authorization request from a service provider which is not necessarily capable of authorizing a user request for content. For example, the service provider may not necessarily be a service provider subscribed to by the user, such that the service provider may not necessarily store information (e.g. user credentials, etc.) required for authorizing the user's access to the content.

As shown in decision 602, it is determined whether an authorization request has been received from a first service provider. In the context of the present embodiment, the authorization request may include any request to authorize access by a user to content provided by the first service provider. Thus, the authorization request may be sent by the first service provider in response to a request by the user to access the content.

If it is determined that an authorization request has not been received from a first service provider, the method 600 continues to wait for such an authorization request to be received. Once it is determined that an authorization request has been received from a first service provider, a second service provider associated with the authorization request is identified. Note operation 604. For example, the second service provider may be identified from the authorization request (e.g. where the authorization request includes an identifier of the second service provider).

In the present embodiment, the second service provider that is identified may include a service provider capable of providing authorization for the particular user that has requested access to the content. For example, the user may be a subscriber to the second service provider. In this way, the second service provider may store credential information capable of being used to authorize the user.

Additionally, the authorization request is forwarded to the second service provider, as shown in operation 606. Accordingly, the second service provider capable of authorizing access to the content by the user may receive the request to perform the authorization. It is then determined whether an authorization response has been received from the second service provider, as shown in decision 608.

If it is determined that an authorization response has not been received from the second service provider, the method 600 continues to wait for such a response to be received. However, once it is determined that an authorization response has been received from the second service provider, the authorization response is provided to the first service provider. Note operation 610.

In the context of the present embodiment, the authorization response includes any response to the authorization request. In one embodiment, the authorization request may be a result of a determination of whether the user is authorized to access the content (i.e. determining whether the user's credentials are valid, determining whether the user is entitled to the content, etc.). Just by way of example, the authorization response may include an authentication validation indicating that the user is authorized to access the content or an authentication failure indicating that the user is not authorized to access the content.

As an option, the authorization response may be converted prior to being provided to the first service provider. For example, the authorization response may be converted into a format used by the first service content provider. Accordingly, the converted authorization response may be provided to the first service provider for use by the first service provider in granting or denying the user access to the content.

Figure 7:
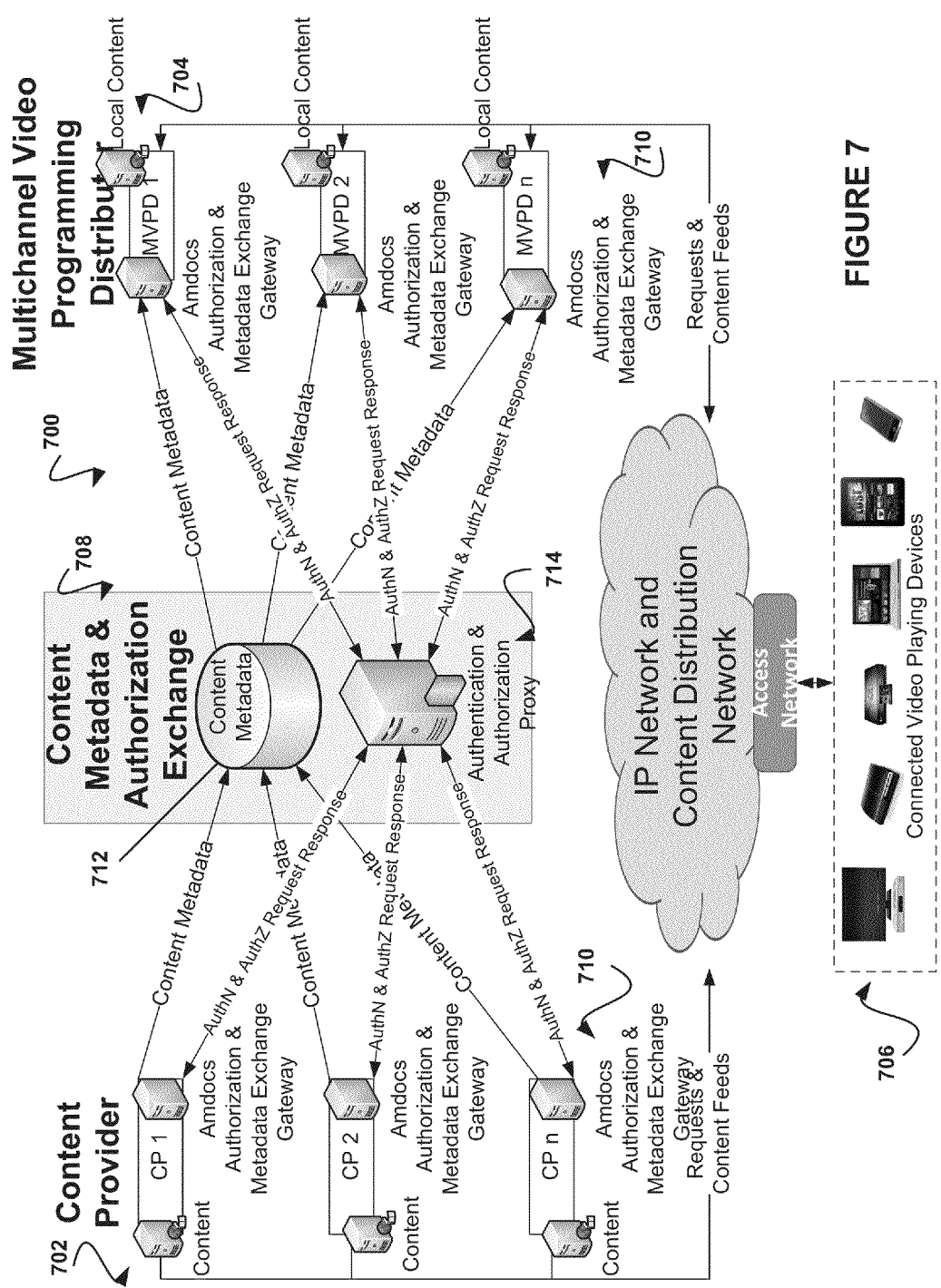
FIG. 7 illustrates a system for content metadata exchange between a content providers and service providers, in accordance with another embodiment.

FIG. 7 illustrates a system 700 for content metadata exchange between a content providers and service providers, in accordance with another embodiment. As an option, the system 700 may be implemented in the context of the details of FIGS. 1-6. Of course, however, the system 700 may be implemented in any desired environment. Again, the aforementioned definitions may equally apply to the description below.

In the present embodiment, a system 700 is shown for the exchange of content metadata and authentication/authorization credentials between content providers 702 (shown as CP1-CPn) and Multichannel Video Programming Distributors (MVPD) 704 (shown as MVPD1-MVPDn), or otherwise referred to above as service providers, who are engaged in the serving of online content to multiple connected devices 706 based on an identity of the consumer using such devices or the device of the consumer and an authorization status of the consumer. Thus, each of the content providers 702 and the MVPDs 704 may store content for retrieval by users.

In one embodiment, MVPDs 704 may be collaborating with content providers 702 to make content available using online mechanisms to authorized consumers. The content may be streamed or downloaded to the consumer's device 706 using the Internet Protocol (IP) via the Internet or via an MVPD's 704 IP backbone and access network. To select the content to be consumed, the consumer may be provided with a catalog of content that is available from collaborating content providers 702. The catalog is constructed from descriptions of the content known as content metadata that are passed from each collaborating content provider 702 to the serving MVPD 704.

Prior to streaming or downloading the content, the serving party (i.e. content provider 702 or MVPD 704) will refer to the owner of the consumer's retail relationship to confirm that the consumer is who he claims to be (i.e. authentication) and that he is entitled (i.e. authorization) to consume the content he are requesting. A content metadata and authorization exchange 708 together with content metadata and authorization exchange gateways 710 may be used to avoid the scaling issues that arise from creating many-to-many relationships between the content providers 702 and MVPDs 704 for the exchange of content metadata and authorization credentials. In addition, the content metadata and authorization exchange 708 together with content metadata and authorization exchange gateways 710 may be used to hide the addresses of the MVPDs 704 from the content providers 702 and to hide the addresses of the content providers 702 from the MVPDs 704.

As shown, the system 700 includes a centralized database 712, globally accessible by trusted parties for reading and writing of content metadata. The system 700 also includes at least one centralized proxy 714 for directing authentication and authorization requests from content providers 702 to MVPDs 704 and authorization responses from MVPDs 704 to content providers 702 whilst hiding user credentials stored by one of the MVPDs 704 from all other MVPDs 704 and content providers 702. Still yet, the system 700 includes servers physically known as "content metadata and authorization exchange gateways" 710 located within the infrastructure of both content providers 702 and MVPDs 704. An administration system (not shown) may also be provided for setting permissions and managing content metadata and authorization exchange gateways 710.

Metadata Contribution, Distribution and Update Operations

Content providers 702 each contribute content metadata to the content metadata and authorization exchange 708 via their associated content metadata and authorization exchange gateway 710. Namely, the centralized database 712 of the content metadata and authorization exchange 708 stores the contributed content metadata. The content metadata and authorization exchange 708 may store content metadata in sets that are associated with the contributing content provider 702. Each content provider 702 may indicate to the content metadata and authorization exchange 708 the sets of content metadata that can be retrieved by each MVPD 704 via an administrative interface. Only the contributing content provider 702 or content metadata and authorization exchange 708 administrator may be capable of deleting or modify the contributed content metadata, as an option.

MVPDs' 704 content metadata and authorization exchange gateways 710 are authorized to retrieve sets of content metadata based on access restrictions set by the content provider 702 and administered by the content metadata and authorization exchange 708 administrator. Such access restrictions may optionally also be received by the content provider 702/content metadata and authorization exchange 708 administrator and stored by the centralized database 712.

The content metadata and authorization exchange 708 may advertises to each MVPD's 704 content metadata and authorization exchange gateway 710 a list of sets of content metadata that they are authorized to retrieve. MVPDs' 704 content metadata and authorization exchange gateways 710 may subscribe to a notification service for updates to sets of content metadata that they are interested in and are authorized to retrieve. A MVPD's 704 content metadata and authorization exchange gateway 710 may retrieve and cache authorized sets of content metadata on a scheduled basis or when notified of an update by the content metadata and authorization exchange 708 notification service. The content metadata may be used by user interface systems of the MVPDs 704 to present to consumers the content that they are able to access via the MVPDs 704 and the conditions for access.

In one embodiment, reliability may be provided by the metadata and authorization exchange 708. For example, the metadata and authorization exchange gateways 710 at the content providers' 702 locations may add a sequence number to each metadata update message sent to the metadata and authorization exchange 708. When a message is seen to have been missed, the metadata and authorization exchange 708 may ask the metadata and authorization exchange gateway 710 to retransmit the missed message. The metadata and authorization exchange gateway 710 at the content provider 702 may then send the message again. To ensure performance and eliminate the need for acknowledgements, updates may be cached by the metadata and authorization exchange gateway 710 at the content provider 702 for a configurable period of time. Further, temporal ordering of updates may be performed by the metadata and authorization exchange 708. In addition, during periods of no update, the metadata and authorization exchange gateway 710 may send dummy update messages to increment the sequence number.

In another embodiment, the metadata and authorization exchange 708 may add a sequence number to each metadata update message sent to the MVPD 704. When a message is seen to have been missed the metadata and authorization exchange gateway 710 at the MVPD 704 may ask for the missed message to be retransmitted. The metadata and authorization exchange 708 sends the message again. To ensure performance and eliminate the need for acknowledgements, updates may be cached by the metadata and authorization exchange 708 for a configurable period of time. Further, temporal ordering of updates may be performed by the metadata and authorization exchange gateway 710. Additionally, during periods of no update, the metadata and authorization exchange 708 may send dummy update messages to increment the sequence number.

Authentication and Authorization Operations

When a content provider 702 is requested by a consumer to serve content, the content provider 702 requires confirmation of the consumer's identity and entitlement. The content provider 702 submits authentication and authorization requests via their metadata and authorization exchange gateway 710 to an authentication and authorization proxy 714 in the content metadata and authorization exchange 708. The metadata and authorization exchange gateway 710 of the content provider 702 inserts the identity of the consumer's MVPD 704 into the authentication and authorization request. The authentication and authorization proxy 708 uses the identity of the consumer's MVPD 704 that is passed in the request from the content provider 702 to direct the authentication and authorization request to the metadata and authorization exchange gateway 710 of the appropriate MVPD 704.

The MVPD 704 that receives the request responds to the authentication and authorization proxy 714 via their metadata and authorization exchange gateway 710 with entitlement data if authentication credentials are validated and authentication failure if validation fails. The authentication and authorization proxy 714 transmits the response from the MVPD 704 to the requesting content provider's 702 metadata and authorization exchange gateway 710. The authentication and authorization proxy 714 may identify the requesting content provider's 702 metadata and authorization exchange gateway 710 using a globally unique identifier included in the request, for transmitting the response to the appropriate metadata and authorization exchange gateway 710. Where required, the metadata and authorization exchange gateway 710 of the content provider 702/MVPD 704 transforms requests and responses into the protocols and formats used by the corresponding content provider 702 and MVPD 704. As an option, globally unique session keys may be attached to each request response session to enable both synchronous and asynchronous operation.

In another embodiment, when an MVPD 704 is requested by a consumer to serve content, the MVPD 704 requires confirmation of the consumer's identity and entitlement. If the consumer is a subscriber of the MVPD 704 then the MVPD 704 performs authentication and authorization operations internally and without utilizing the metadata and authorization exchange 708.

If the consumer is a subscriber of an alternative MVPD 704 and the MVPD 704 contacted by the user is willing to provide service, the contacted MVPD 704 submits authentication and authorization requests via their metadata and authorization exchange gateway 710 to the authentication and authorization proxy 714 in the content metadata and authorization exchange 708. The authentication and authorization proxy 714 uses the identity of the consumer's MVPD 704 that is passed in the request from the contacted MVPD 704 to direct the authentication and authorization request to the metadata and authorization exchange gateway 710 of the appropriate MVPD 704.

The MVPD 704 performing the authorization responds to the authentication and authorization proxy 708 via their metadata and authorization exchange gateway 710 with entitlement data if authentication credentials are validated and authentication failure if validation fails. The authentication and authorization proxy 708 transmits the response from the MVPD 704 to the requesting (contacted) MVPD's 704 metadata and authorization exchange gateway 710.

Administrative Operations

The metadata and authorization exchange 708 may support administrative operations for the following:

1) addition and removal of metadata and authorization exchange gateways 710;

2) configuration management of metadata and authorization exchange gateways 710;

3) creation and management of security credentials for metadata and authorization exchange gateways 710;

4) setup and management of permissions for ingestion and distribution of content provider 702 content metadata to authorized MVPDs 704;

5) Routing and load balancing of authentication and authorization requests from content providers 702 to MVPDs 704;

6) Disaster recovery fail-over for the metadata and authorization exchange gateways 710 (e.g. there may be a keep-alive message transmitted between the metadata and authorization exchange gateways 710 and metadata and authorization exchange 708, such that after a configurable number of missed keep-alive messages by a metadata and authorization exchange gateway 710, the metadata and authorization exchange gateway 710 is deemed offline by the metadata and authorization exchange 708 rerouting of messages directed to the offline metadata and authorization exchange gateway 710 is performed by the metadata and authorization exchange 708):

7) auditing of administrative changes and transactions between metadata and authorization exchange gateways 710:

8) usage reporting; and 9) prevention of denial of service attacks by pacing communications (e.g. authorization requests) between content providers and service providers.

As a further option, content providers 702 may be provided with administrative controls to set permissions that restrict or allow content metadata to be seen by MVPDs 704 connected to the metadata and authorization exchange 708. In addition, MVPDs 704 may be provided with administrative controls to set permissions that restrict or allow authentication and authorization requests from content providers 702 connected to the metadata and authorization exchange 708.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:

computer code for storing, in a central repository, content metadata from each of a plurality of content providers, where the content metadata includes:

a description of content associated with the content metadata, including a title, summary, author, and size of the content, identification of at least one format in which the content is available, and conditions for accessing the content, including a time period in which the content is available;

computer code for storing, in the central repository, information identifying which of the content metadata is assigned to each of a plurality of service providers, where each of the plurality of service providers is allowed to access, at one or more of the content providers, the content associated with the content metadata assigned to the service provider, computer code for receiving, at a central proxy, an authorization request from one of the plurality of content providers, the authorization request including a request to authorize a user to access the content;

computer code for determining, at the central proxy, the service provider to which the user subscribes, utilizing routine information associated with the service provider that is included in the authorization request;

computer code for sending the authorization request from the central proxy to the determined service provider;

computer code for performing a plurality of actions at the determined service provider, including:
- determining whether the user is authorized to access the requested content,
- authenticating the user, using credentials input by the user, and
- determining whether the conditions for accessing the requested content are met;

computer code for receiving, at the central proxy, an authorization response from the determined service provider indicating whether the user is authorized to access the requested content, based on the plurality of actions performed at the determined service provider, computer code for receiving, at the one of the plurality of content providers that sent the authorization request, the authorization response from the central proxy; and computer code for determining, at the one of the plurality of content providers that sent the authorization request, whether to grant or deny access to the content to the user, based on the authorization response.

2. The computer program of claim 1, wherein the computer program is operable such that the content metadata is stored in groups according to the content providers.

3. The computer program of claim 1, wherein the central repository is central to the content providers and the service providers.

4. The computer program of claim 1, further comprising computer code for converting the authorization response from the determined service provider into a format used by the content provider that sent the authorization request prior to providing the authorization response to the content provider, such that the converted authorization response is provided to the content provider.

5. The computer program of claim 1, wherein the central proxy is central to the content providers and the service providers.

6. A method, comprising:
storing, in a central repository, content metadata from each of a plurality of content providers, where the content metadata includes:
- a description of content associated with the content metadata, including a title, summary, author, and size of the content,
- identification of at least one format in which the content is available, and
- conditions for accessing the content, including a time period in which the content is available;

storing, in the central repository, information identifying which of the content metadata is assigned to each of a plurality of service providers, where each of the plurality of service providers is allowed to access, at one or more of the content providers, the content associated with the content metadata assigned to the service provider;

receiving, at a central proxy, an authorization request from one of the plurality of content providers, the authorization request including a request to authorize a user to access the content;

determining, at the central proxy, the service provider to which the user subscribes, utilizing routine information associated with the service provider that is included in the authorization request;

sending the authorization request from the central proxy to the determined service provider, performing a plurality of actions at the determined service provider, including:
- determining whether the user is authorized to access the requested content,
- authenticating the user, using credentials input by the user, and
- determining whether the conditions for accessing the requested content are met;

receiving, at the central proxy, an authorization response from the determined service provider indicating whether the user is authorized to access the requested content, based on the plurality of actions performed at the determined service provider, receiving, at the one of the plurality of content providers that sent the authorization request, the authorization response from the central proxy; and determining, at the one of the plurality of content providers that sent the authorization request, whether to grant or deny access to the content to the user, based on the authorization response.

7. A system, comprising:
a central repository for:
storing content metadata from each of a plurality of content providers, where the content metadata includes:
- a description of content associated with the content metadata, including a title, summary, author, and size of the content,
- identification of at least one format in which the content is available, and
- conditions for accessing the content, including a time period in which the content is available;

storing, information identifying which of the content metadata is assigned to each of a plurality of service providers, where each of the plurality of service providers is allowed to access, at one or more of the content providers, the content associated with the content metadata assigned to the service provider; and a central proxy including a processor for:
receiving an authorization request from one of the plurality of content providers, the authorization request including a request to authorize a user to access the content;

determining, at the central proxy, the service provider to which the user subscribes, utilizing routing information associated with the service provider that is included in the authorization request;

sending the authorization request from the central proxy to the determined service provider, wherein the system is operable such that a plurality of actions are performed at the determined service provider, including:

determining whether the user is authorized to access the requested content, authenticating the user, using credentials input by the user, and determining whether the conditions for accessing the requested content are met;

wherein the system is operable such that the central proxy receives an authorization response from the determined service provider indicating whether the user is authorized to access the requested content, based on the plurality of actions performed at the determined service provider;

wherein the system is operable such that the one of the plurality of content providers that sent the authorization request receives the authorization response from the central proxy;

wherein the system is operable such that the one of the plurality of content providers that sent the authorization request determines whether to grant or deny access to the content to the user, based on the authorization response.

8. The system of claim 7, wherein the central repository and central proxy are components of a system including a processor coupled to memory via a bus.

\* \* \* \* \*